Figure 3:
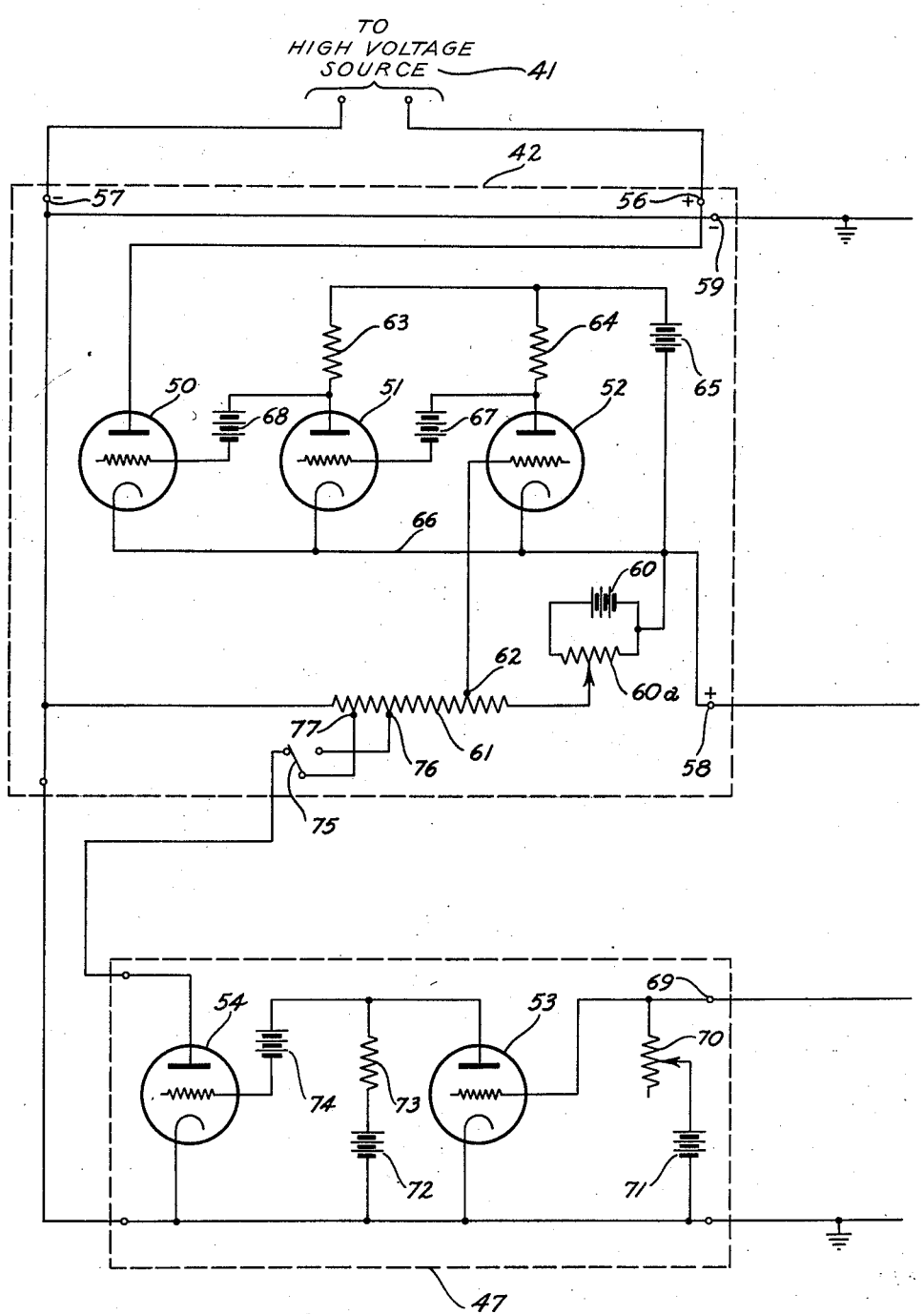

Jan. 7, 1958     E. O. LAWRENCE     2,819,401
APPARATUS FOR CONTROLLING THE POSITION OF
AN ION BEAM IN A CALUTRON
Filed Sept. 25, 1944     2 Sheets-Sheet 1
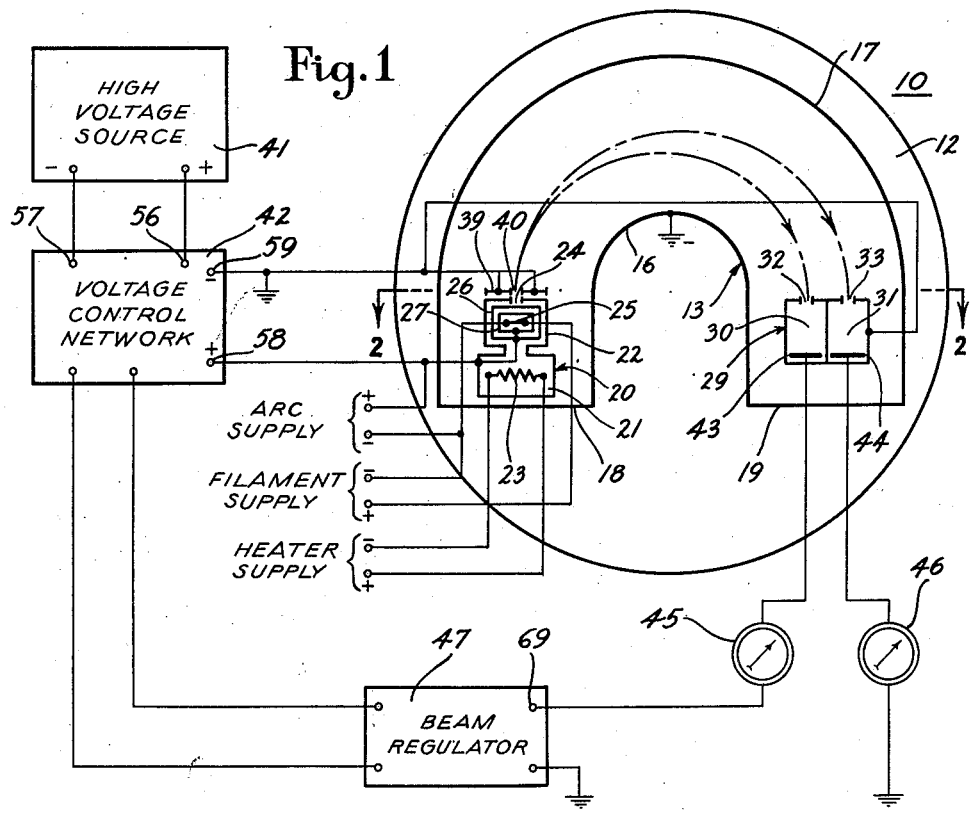
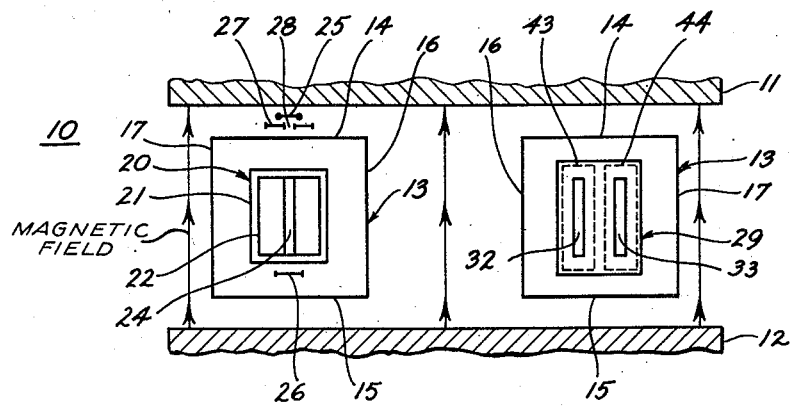
INVENTOR.
ERNEST O. LAWRENCE
BY Robert A. Lavender
ATTORNEY.

United States Patent Office 2,819,401
Patented Jan. 7, 1958

2,819,401

APPARATUS FOR CONTROLLING THE POSITION OF AN ION BEAM IN A CALUTRON

Ernest O. Lawrence, Berkeley, Calif., assignor to the United States of America as represented by the United States Atomic Energy Commission Application September 25, 1944, Serial No. 555,613

21 Claims. (Cl. 250—41.9)

The present invention relates to improvements in electric discharge devices and more particularly to improvements in electric discharge devices of the calutron type.

It is an object of the present invention to provide an apparatus for automatically maintaining an electric discharge device of the calutron type in continuous optimum operation.

Another object of the present invention is to provide an apparatus that will automatically maintain an electric discharge device of the calutron type in continuous and uniform operation in accordance with a predetermined set of conditions.

Still another object of the present invention is to provide an apparatus that will automatically maintain the ion beam in a calutron directed along a predetermined path.

A further object of the present invention is to provide an apparatus that will automatically coordinate the operating characteristics of a calutron thereby to maintain the ion beam of the calutron along a predetermined path.

Still a further object of the present invention is to provide a simple electrical network which will so coordinate the operating values of a calutron thereby to maintain the ion beam of the calutron along a predetermined path.

The invention, both as to its organization and method of operation, together with other objects and advantages thereof, will best be understood by reference to the following specification taken in connection with the accompanying drawings, in which Figure 1 is a diagrammatic plan view of a calutron into which there is incorporated a beam regulator embodying the present invention; Fig. 2 is a diagrammatic sectional view taken along line 2—2 in Fig. 1; and Fig. 3 is a schematic view of a voltage control network and a beam regulator embodying the present invention.

At the outset, it is noted that a "calutron" is a machine of the character of that disclosed in the copending application of Ernest O. Lawerence, Serial No. 557,784, filed October 9, 1944, now Patent No. 2,709,222 granted May 24, 1955, and is employed to separate the constituent isotopes of an element and, more particularly, to increase the proportion of a selected isotope in an element containing several isotopes in order to produce the element enriched with the selected isotope. For example, the machine is especially useful in producing uranium enriched with $U^{235}$.

Such a calutron essentially comprises means for vaporizing a quantity of material containing an element that is to be enriched with a selected one of its several isotopes; means for subjecting the vapor to ionization, whereby at least a portion of the vapor is ionized causing ions of the several isotopes of the element to be produced; electrical means for segregating the ions from the unionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

The operation of a calutron of the Lawrence type is characterized by the projection of a beam of ions of predetermined energy into a magnetic field normal to the ion beam, whereby the ions traverse circular paths whose radii are proportional to the square roots of the ratios of the masses of the ions to their respective charges and to the square root of the voltage impressed on the ions and are inversely proportional to the intensity of the magnetic field. Further, when the Lawrence calutron is employed in producing uranium enriched with $U^{235}$ from uranium of the natural occurring isotopic ratio, the ion beam current density distribution over a transverse cross section of the ion beam in the region of the ion collectors generally has only one peak, that peak being in the area of maximum concentration of $U^{238}$, the maximum concentration of $U^{235}$ being evidenced by merely an irregularity in the ion current density distribution, which irregularity is displaced from the ion current density peak. The aforesaid distribution of ion beam current density is a result of a divergent beam, gas scattering of the ions forming the beam, variations in the energies imparted to the ions, and numerous other causes.

Inasmuch as the ion receivers in a Lawrence calutron are relatively fixed with respect to the ion beam source and inasmuch as the direction of projection of the ion beam is also fixed, it is necessary to so correlate the operating values of the calutron that the beam traverses a substantially fixed path which is determined by the aforesaid spacing between the ion collectors and ion beam source. Most critical of these operating values are the intensity of the magnetic field and the voltage imparted to the ion beam. Moreover, the voltage imparted to the ion beam is simple to adjust and regulate and the beam path may be accurately controlled by varying the voltage imparted to the ion beam, the beam path being instantaneously responsive to a change in voltage, thus rendering this type of control most desirable for regulating the ion beam path. Further, under operating conditions of optimum beam path, specifically when the total ion beam current is substantially constant and a source material containing naturally occurring uranium is being processed, the ion beam current to the $U^{235}$ receiver assumes a constant value and any positive or negative deviation therefrom is an indication that the radius of curvature of the ion beam is respectively too small or too large.

In its broad aspect, the present invention involves the automatic regulation of an operating value of a calutron in accordance with a condition which is responsive to a characteristic of the ion beam. Thus, in carrying out the objects of the present invention, the path of the ion beam is regulated as a function of the ion current at a predetermined section of the beam. Moreover, at optimum operating conditions in a calutron, more particularly in a calutron processing uranium having the natural occurring isotopic ratio, the variation of the ion beam current density along the region of the $U^{235}$ ion receiver is unidirectional and an increase in the radius of curvatures of the ion beam results in a decrease in the ion current to the $U^{235}$ ion receiver. Therefore, in a preferred embodiment of the present invention the voltage impressed on the ion beam is automatically regulated as a function of the current to the $U^{235}$ ion receiver, a rise of current to the ion receiver being followed by a rise in voltage impressed on the ion beam thus tending to return the beam to its original optimum path, and similarly, a drop in current to the ion receiver being followed by a drop in the voltage impressed on the ion beam.

Referring now to the drawings, there is illustrated a calutron 10 of the character noted in which there is incorporated an apparatus embodying the features of the present invention. More particularly, the calutron 10 comprises magnetic field structure including upper and lower pole pieces 11 and 12, provided with substantially flat parallel spaced apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer side walls 16 and 17 and end walls 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order $10^{-5}$ to $10^{-4}$ mm. Hg. Preferably, the component parts of the tank 13 are formed of steel, the top and bottom walls 14 and 15 thereof being spaced a short distance from the pole faces of the upper and lower pole pieces 11 and 12, respectively, the tank 13 being retained in such position in any suitable manner, whereby the top and bottom walls 14 and 15 constitute in effect pole pieces with respect to the interior of the tank 13. It should be noted that the magnetic field in that region of the tank 13 which is traversed by the ion beam should be substantially homogeneous.

The removable end wall 18 suitably supports a source unit 20 comprising a charge receptacle 21 and a communicating arc-block 22. An electric heater 23 is arranged in heat exchange relation with the charge receptacle 21 and is adapted to be connected to a suitable source of heat supply, whereby the charge receptacle 21 may be appropriately heated, the charge receptacle 21 being formed of stainless steel or the like. The arc-block 22 is formed, at least partially, of carbon or graphite and is substantially C-shaped in plan, an upstanding slot 24 being formed in the wall thereof remote from the charge receptacle 21. Thus, the arc-block 22 is of hollow construction, the cavity therein communicating with the interior of the charge receptacle 21.

Also, the removable end wall 18 carries a filamentary cathode 25 adapted to be connected to a suitable source of filament supply, the filamentary cathode 25 overhanging the upper end of the arc-block 22 and arranged in alignment with respect to the upper end of the cavity formed therein. The arc-block 22 carries an anode 26 disposed adjacent the lower end thereof and arranged in alignment with respect to the cavity formed therein. Also, the arc-block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc-block 22. Both the anode 26 and the collimating electrode 27 are electrically connected to the source unit 20 which in turn is insulated from the tank 13, the tank 13 being grounded. Also, the filamentary cathode 25 and the cooperating anode 26 are adapted to be connected to a suitable source of arc supply.

Further, the removable end wall 18 carries ion accelerating structure or electrode 39 formed of carbon or graphite and disposed in space-apart relation with respect to the wall of the arc-block 22 in which the slot 24 is formed. More specifically, a slit 40 is formed in the ion accelerating electrode 39 and arranged in substantial alignment with respect to the slot 24 formed in the wall of the arc-block 22. A suitable source of high voltage 41 is connected through a voltage control network 42 between the arc-block 22 and the ion accelerating electrode 39, the arc-block 22 being connected to the positive terminal and the accelerating electrode 39 being connected to the negative terminal. The potential applied to the accelerating electrode 39 with respect to the arc-block 22 may be varied either manually or automatically by means of the voltage control network 42, as will be hereinafter described. Further, the ion accelerating electrode 39 is connected to the tank 13 which in turn is grounded.

The removable end wall 19 suitably supports a collector block 29 formed of stainless steel or the like and provided with two laterally spaced-apart cavities or pockets 30 and 31 which respectively communicate with aligned slots 32 and 33 formed in the wall of the collector block 29 disposed remote from the removable end wall 19. The pockets 30 and 31 are adapted to receive constituent portions of an ion beam which are respectively enriched and impoverished in a preselected isotope of the element which is being processed as explained more fully hereinafter. It will be noted that the accelerating electrode 39, the tank 13 and the collector block 29 are connected to the negative grounded terminal of the high voltage source 41; while the ion source unit 20 is connected to the ungrounded positive terminal of the high voltage source 41 and is electrically insulated from the component parts of the tank 13. Thus, it will be understood that the tank 13 constitutes an electrostatic shield for the high velocity ions traversing curved paths between the slit 40 formed in the ion accelerating electrode 39 and the slots 32 and 33 formed in the collector block 29, as explained more fully hereinafter.

The receiving pockets 30 and 31 have positioned therein adjacent the rear walls thereof ion current collecting electrodes or collectors 43 and 44 which are adapted to intercept the portions of the ion beam entering the receiving pockets 30 and 31 through the slits 32 and 33. The current collecting plates 43 and 44 are insulated from the walls of the receiving pockets 30 and 31, the current collecting plate 43 being connected through the current reading meter 45 to an input terminal of the beam regulator 47 the other input terminal of which is grounded, and the current collecting plate 44 being connected through a current reading meter 46 to ground. Further, the output of the beam regulator 47 is connected to the voltage control network 42, the voltage applied between the accelerating electrode 39 and the arc-block 22 being automatically regulated through the voltage control network 42 by the beam regulator 47 which in turn is responsive to the current to the collector plate 43, as will be hereinafter explained.

Considering now the general principle of operation of the calutron 10, a charge comprising a compound of the element to be treated is placed in the charge receptacle 21, the compound of the element mentioned being one which may be readily vaporized. The end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg. is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc-block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceeding from the filamentary cathode 25 through the collimating slot 28 formed in the collimating electrode 27 to the anode 26. The collimating slot 28 formed in the collimating electrode 27 defines the cross section of the stream of electrons proceeding into the arc-block 22, whereby the arc discharge has a ribbon-like configuration and breaks up the molecular form of the compound of the vapor to a considerable extent, producing positive ions of the element that is to be enriched with the selected one of its isotopes.

The electric circuit between the high voltage source 41, the arc-block 22 and the accelerating electrode 39 is then completed through the voltage control network 42, thus impressing a high positive potential on the arc-block 22 with respect to the accelerating electrode 39. It should be noted that the connection between the voltage control network 42 and the beam regulator 47 may be opened by any suitable arrangement when beam regulation is not desired. The high voltage applied between the accelerating electrode 39 and the arc-block 22 results in the positive ions in the arc-block 22 being attracted by the accelerating electrode 39 and accelerated through the voltage impressed therebetween. More particularly, the positive ions proceed from the cavity formed in the arc-block 22 through the slot 24 formed in the wall thereof, and across the space between the ion accelerating electrode 39 and the adjacent wall of the arc-block 22, and thence through the slit 40 formed in the ion accelerating electrode 39 into the substantially electric-field-free space defined by the walls of the tank 13 beyond the accelerating electrode 39. The high-velocity positive ions form a vertical upstanding beam proceeding from the cavity formed in the arc-block 22 through the slot 24 and the aligned slit 40 and through the interior of the tank 13.

As previously noted, the collector block 29, as well as the tank 13, is electrically connected to the ion accelerating electrode 39, whereby there is an electric-field-free path for the high-velocity positive ions disposed between the ion accelerating electrode 39 and the collector block 29 within the tank 13. Moreover, the slits 32 and 33 formed in the receiver pockets 30 and 31 are spaced at a fixed distance from the slit 40 in the accelerating electrode 39 and are also spaced at a fixed distance relative to each other, the relationship between the distance separating the slits 32 and 33, and the distance separating these slits and the slit 40 formed in the accelerating electrode 39 being determined by the masses of the respective ions whose reception is desired. More particularly, the high-velocity ions leaving the slit 40 formed in the accelerating electrode 39 are deflected from their normal straight-line paths and from a vertical plane passing through the slot 24 and the aligned slit 40, due to the effect of the relatively strong magnetic field maintained through the space within the tank 13 through which the positive ions travel, whereby the positive ions describe arcs, the radii of which are proportional to the square roots of the mass-to-charge ratios of the ions, proportional to the square root voltage impressed on the ions, and inversely proportional to the magnetic field traversed by the ions. Thus, the spacings between the slit 40 in the accelerating electrode 39 and the slits 32 and 33 respectively are proportional to the square roots of the masses of the ions they are designed to collect.

Further, when the calutron is employed in producing uranium enriched with $U^{235}$ from uranium of the naturally-occurring isotopic ratio, as has been previously noted, the ion beam current density distribution over a transverse cross section of the ion beam in the region of the ion collectors generally has only one peak, that peak being in the area of maximum concentration of $U^{238}$, the maximum concentration of $U^{235}$ being evidenced by merely an irregularity in the ion current density distribution, which irregularity is displaced from the peak toward the source of the beam. Therefore, in adjusting the calutron for optimum performance, the voltage applied between the arc-block 22 and the accelerating electrode 39 is adjusted by means of the voltage control network 42 so that the ion current through the slit 33 to the current collector is a maximum, as indicated by the current reading meter 46, the beam regulator 47 having been disconnected from the voltage control network 42 during such adjustment. At this adjustment, if the slits 32 and 33 communicating with the receiver pockets 30 and 31 and the slit 40 formed in the accelerating electrode 39 are properly spaced and dimensioned, the ions passing through the slit 32 into the receiver pocket 30 should be greatly enriched with $U^{235}$. It should be noted that the ions impinging on the current-collecting plates 43 and 44 are neutralized at these plates, causing a current to flow therefrom through the associated leads, meters and networks to ground, the neutralized material either sticking to the plates 43 and 44 or scattering to the other walls of the receiving pockets 30 and 31. Moreover, the currents from the current-collecting plates 43 and 44 are substantially equal to the ion beam currents respectively entering the receiver pockets 30 and 31 through the slits 32 and 33.

The current from the current-collecting plate 43 in the receiving pocket 30 is fed through the current meter 45 and the input to the beam regulator 47 to ground. Further, the output of the voltage control network 42 so responds to the output of the beam regulator 47 that a rise in the input current to the beam regulator 47 results in a rise in the voltage output of the voltage control network 42; similarly, a drop in the input current to the beam regulator 47 results in a drop in the voltage output of the voltage control network 42. The voltage impressed between the accelerating electrode 39 and the arc-block 22 is adjusted as will be hereinafter described by means of the beam regulator 47 and the voltage control network 42 to maximize the current to the current-collecting plate 44, as indicated by the current meter 46. The calutron will thereafter operate so as to maintain the current from the current-collecting plate 43 substantially constant, which under normal operating conditions insures continuous operation of the calutron at the original setting; that is, the path traversed by the ion beam will remain substantially constant. The above result is obtained inasmuch as any change in the radius of the path traversed by the ion beam is reflected by an inverse change in the current from the current-collecting plate 43. Moreover, any change in current from the plate 43 results in a proportional change in the voltage output of the beam regulator 47, and consequently a similar change in the voltage impressed between the accelerating electrode 39 and the arc-block 22, which change urges the beam to its originally predetermined path as reflected by the ion current to the current-collecting plate 43.

At convenient intervals during the operation of the calutron 10 the beam regulator 47 may be adjusted to maximize the ion current to the receiving pocket 31, as indicated by the current meter 46. The frequency of these intervals is determined primarily by the constancy of the total beam current which, in turn, is greatly influenced by the performance of the ion source. Thus, readjustment is seldom necessary when the ionizing discharge through the arc-block 22 is stable and uniform. After all of the charge in the charge receptacle 21 has been vaporized, all of the electric circuits are interrupted and the end wall 18 is removed so that another charge may be placed in the charge receptacle 21 and subsequently vaporized in the manner explained above. After a suitable number of charges have been vaporized in order to obtain appropriate deposits of the isotopes of the element in the pockets 30 and 31 of the collector block 29, the end wall 19 may be removed and the deposits of the collected isotopes in the pockets 30 and 31 in the collector block 29 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection reference is again made to the copending application of Ernest O. Lawrence, for a complete specification of a calutron especially designed for the production of uranium enriched with the isotope $U^{235}$. By way of illustration, it is noted that when the calutron 10 is employed in order to produce uranium enriched with $U^{235}$, the compound of uranium that is suggested as a suitable charge in the charge receptacle 21 is $UCl_4$, as this compound may be readily vaporized and the molecular form of the vapor may be readily broken up to form positive ions of uranium with great facility. In this case, uranium enriched with $U^{235}$ is collected in the pocket 30 of the collector block 29, and uranium comprising principally $U^{238}$ is collected in the pocket 31 of the collector block 20. Also, as previously noted, the deposit of uranium collected in the pocket 30 of the collector block 29 contains considerable amounts of $U^{238}$, in view of the fact that this isotope comprises the dominant constituent of normal uranium. Furthermore, the deposit of uranium collected in the pocket 30 of the collector block 29 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 30 of the collector block 29 is considerably enriched, both with $U^{234}$ and with $U^{235}$, and considerably impoverished with respect to $U^{238}$ as compared to natural or normal uranium.

Referring now to Fig. 3 of the drawings, there is schematically illustrated a voltage control network 42 and beam regulator 47 embodying the features of the present invention. The voltage control network includes a voltage regulating arrangement and comprises triodes 50, 51, and 52 and the associated network, whereas the beam regulator 47 comprises the triodes 53 and 54 and the associated network. More specifically, the voltage regulating arrangement is of the type which maintains a constant voltage across a fixed section of a voltage dividing network connected across the output of the voltage control network 42, the total voltage output thereof depending on the ratio of the resistance of a fixed section of the voltage dividing network to the total resistance of the voltage dividing network. Further, the beam regulator 47, in response to the current to the collector 43 varies the voltage output of the entire network by varying the ratio of the resistance of the fixed section of the voltage dividing network to the resistance of the entire voltage dividing network, as will be hereinafter described.

Considering the voltage control network 42 and the beam regulator 47 in detail, terminals 56 and 57 are connected respectively to the positive and negative terminals of the high voltage source 41, whereas terminals 58 and 59 are connected respectively to the ion source unit 20 and the ion accelerating electrode 39 of the calutron transmitter. A voltage standard 60 which may be varied by means of a potentiometer 60a, and a tapped voltage dividing resistor 61 are series connected between the output terminals 58 and 59. The control grid of the triode 52 is connected to a tap 62 on the voltage dividing resistor 61 whereby the potential of the voltage standard 60 or a part thereof may be applied as bias to the aforesaid grid. Further, the cathodes of the triodes 50, 51, and 52 are connected by way of a common lead 66 to the output terminal 58, the anodes of the triodes 51 and 52 being connected through the resistors 63 and 64 to the positive terminal of a suitable plate power supply 65, the negative terminal of which is connected to the lead 66. The outputs of the triodes 52 and 51 are respectively applied through the coupling batteries 67 and 68 to the control grids of the triodes 51 and 50, the anode of the triode 50 being connected to the terminal 56.

The ion current collecting electrode 43 is connected to an input terminal 69 of the beam regulator 47 and this terminal is in turn connected to the control grid of the triode 53 and grounded through a series connected variable resistor 70 and a suitable grid bias supply 71. Further, the positive terminal of a source of plate voltage 72 is connected through a plate resistor 73 to the anode of the triode 53, the negative terminal of the plate voltage supply 72 and the cathode of the triode 53 being grounded. Moreover, the output of the triode 53 is applied to the control grid of the triode 54 through a coupling battery 74, the cathode of the triode 54 being grounded and the anode being connected to one of the contacts of a double-throw switch 75, the other contact of which is connected to a tap 76 on the voltage dividing resistor 61. Further, the blade of the switch 75 is connected to another tap 77 positioned on the voltage dividing resistor 61 between the grounded end thereof and the tap 76.

Considering now the operation of the circuit network above described, the terminals 56 and 57 which are connected to the high voltage power supply are shunted by the voltage dividing network comprising the series-connected triode 50, variable voltage standard and potentiometer circuit 60—60a, and the tapped voltage dividing resistor 61. Further, the output terminals 58 and 59 of the aforesaid circuit network are applied to the ion source unit 20 and the ion accelerating electrode 39 of the calutron transmitter and are also connected respectively to the cathode of the triode 50 and the grounded terminal 57, which in turn is connected to the negative pole of the high voltage power supply. The output voltage between the terminals 58 and 59 is a function of the resistance of the triode 50, which resistance is controlled by the control grid of the triode 50, that in turn responds to the input to the triode 52. Moreover, the input to the triode 52 consists of the adjustable voltage of the voltage standard 60 in addition to the voltage drop across the upper tapped portion of the resistor 61, as taken from the tap 62. It should be noted that the triodes 50, 51, and 52 and the associated network including the upper tapped portion of the resistor 61 tend to maintain a constant potential on the grid of the triode 52 with respect to the cathode thereof, and consequently to maintain a constant voltage between the tap 62 and the lead 66. Thus any drift in the current through the resistor 61 is followed by a change in the signal to the triode 52 and a change in the resistance of the triode 50, thereby urging the current in resistor 61 to its predetermined value. Furthermore, the current through the resistor 61 may be varied to any desired value by adjusting the potentiometer 60a, inasmuch as the change in grid voltage supplied by the voltage standard 60 is followed by an opposite change in the voltage drop across the upper tapped portion of the resistor 61 and consequently in a change in the current through the resistor 61. It is therefore apparent that the voltage output across the terminals 58 and 59 is highly regulated and may be adjusted by means of the potentiometer 60a.

The beam regulator 47 varies the voltage across the terminals 58 and 59 by varying the ratio of the resistance of the upper tapped portion of the resistor 61 to the resistance of the entire resistor 61 shunted by the triode 54. It should here be noted that when the blade of the switch 75 is in the clockwise closed position the beam regulator 47 is disconnected from the voltage control network 42 and the portion of the resistor 61 between the taps 76 and 77 is shorted out whereby the resistance between the terminals 58 and 59 is substantially equal to the latter resistance when the blade of the switch 75 is in its counterclockwise position and the resistance of the triode 54 is at about its operating midpoint. Since the voltage regulating network maintains a substantially constant predetermined current through the resistor 61 and the shunting triode 54, any change in the resistance of the triode 54 results in a change in the voltage output across the terminals 58 and 59. Further, the resistance of the triode 54 is controlled by the input current to the terminal 69, which is connected to the calutron ion current collecting electrode 43, and by the resistance of the variable resistor 70. Thus an increase or decrease in the current through, or the value of, the variable resistor 70 results in a corresponding change in the input to the triode 53 and the consequent corresponding change in the resistance of the triode 54. Therefore, an increase in the current to the collector electrode is followed by an increase in the input signal to the triode 53 and an increase in the resistance 54, thereby raising the ion accelerating voltage applied to the calutron ion source from the terminals 58 and 59 and altering the calutron ion beam path in a direction which results in a decrease in the ion current to the collector electrode, as has been heretofore described. Similarly, a decrease in current to the collector electrode is accompanied by a drop in the ion accelerating voltage applied to the calutron transmitter, thereby urging the ion beam to traverse a path which results in an increase in the current to the collector electrode. Thus, the calutron may be considered a stage in a negative feedback amplifier which includes the triodes 53 and 54 and the associated network, the aforesaid negative feedback amplifier urging the calutron ion beam to traverse a predetermined path as indicated by the current to the collecting electrode positioned in the path of the ion beam.

Considering now the operation of a calutron incorporating the voltage control network 42 and beam regulator 47 above described, the blade of the switch 75 is initially set to the clockwise position, thereby shorting out the section of the voltage dividing resistor 61 between the taps 76 and 77 and disconnecting the beam regulator from the calutron accelerating voltage network. Thereafter, the potentiometer 60a is adjusted until the calutron ion beam is at its optimum position, which results in maximum ion current to the collector electrode 44, as indicated on the current meter 46, and the current to the collector electrode 43, as indicated on the current meter 45, is noted. The blade of the switch 75 is then returned to its counterclockwise position as indicated in the drawing, thereby shunting a section of the resistor 61 by the triode 54, and the variable resistor 70 is adjusted for maximum current to the collector electrode 44 or for the previously noted current to the collector electrode 43, at which point the current to the collector electrode 44 should be a maximum. Moreover, the ion beam path may be periodically optimized by adjusting the variable resistor 70 for maximum current to the collector electrode 44, as well as a high ratio of the current to the collector electrode 44 to the current to the collector electrode 43. If the optimum beam path cannot be obtained within the range of the variable resistor 70, the switch may be thrown to its clockwise position and the above-described procedure repeated.

While there have been described what are at present considered to be preferred embodiments of the invention, it will be understood that various modifications may be made therein and it is intended to cover in the appended claims all such modifications as fall within the true spirit and scope of the invention.

What is claimed is:

1. Apparatus for isotopically enriching an element having at least one isotope occurring in relatively small quantity with respect to the remainder of said element comprising a substantially fluid-tight tank, means for establishing a magnetic field along a given axis through said tank, means for projecting a beam of ions of said element along a variable path through said tank substantially transversely of said given axis, the cross section of said beam taken substantially 180 degrees from said projecting means having a region of irregularity in the ion density distribution therein caused by concentration of ions of said isotope, an electrode arranged in said tank in intercepting relation with respect to ions of said isotope substantially 180 degrees from said projecting means, and automatic means responsive to the current to said electrode for regulating the trajectory of said ion beam in order to maintain said intercepting relationship.

2. Apparatus for isotopically enriching an element having at least one isotope occurring in relatively small quantity with respect to the remainder of said element comprising a substantially fluid-tight tank, means for establishing a magnetic field along a given axis through said tank, means for projecting a beam of ions of said element along a variable path through said tank substantially transversely of said given axis, the cross section of said beam taken substantially 180 degrees from said projecting means having a region of irregularity in the ion density distribution therein caused by concentration of ions of said isotope, whereby said ions traverse paths in accordance with their respective mass-to-charge ratios, an ion receiver arranged in said tank in intercepting relation with respect to ions of said isotope substantially 180 degrees from said projecting means, and automatic means responsive to the current to said ion receiver for regulating the trajectory of said ion beam in order to maintain said intercepting relationship.

3. Apparatus for isotopically enriching an element having at least one isotope occurring in relatively small quantity with respect to the remainder of said element comprising a substantially fluid-tight tank, means for establishing a magnetic field along a given axis through said tank, means for projecting a beam of ions of said element along a variable path through said tank substantially transversely of said given axis, the cross section of said beam taken substantially 180 degrees from said projecting means having a region of irregularity in the ion density distribution therein caused by concentration of ions of said isotope, an electrode arranged in said tank in intercepting relation with respect to ions of said isotope substantially 180 degrees from said projecting means, and means responsive to the current to said electrode for maintaining said intercepting relationship.

4. Apparatus for isotopically enriching an element having at least one isotope occurring in relatively small quantity with respect to the remainder of said element comprising a substantially fluid-tight tank, means for establishing a magnetic field along a given axis through said tank, means for projecting a beam of ions of said element along a variable path through said tank substantially transversely of said given axis, the cross section of said beam taken substantially 180 degrees from said projecting means having a region of irregularity in the ion density distribution therein caused by concentration of ions of said isotope, an electrode arranged in said tank in intercepting relation with respect to ions of said isotope substantially 180 degrees from said projecting means, and means controlled in accordance with the current to said electrode for maintaining said intercepting relationship.

5. Apparatus for isotopically enriching an element having at least one isotope occurring in relatively small quantity with respect to the remainder of said element comprising a substantially fluid-tight tank, means for establishing a magnetic field along a given axis through said tank, means for projecting a beam of ions of said element along a variable path through said tank substantially transversely of said given axis, whereby said ions traverse paths in accordance with their respective mass-to-charge ratios forming an ion density distribution having a region of irregularity caused by concentration of ions of said isotope substantially 180 degrees from said projecting means, an ion receiver arranged in said tank in intercepting relation with respect to ions of said isotope substantially 180 degrees from said projecting means, and means responsive to the current to said ion receiver for maintaining said intercepting relationship.

6. Apparatus for isotopically enriching an element having at least one isotope occurring in relatively small quantity with respect to the remainder of said element comprising a substantially fluid-tight tank, means for establishing a magnetic field along a given axis through said tank, a source of ions of said element, means for imparting energy to said ions, whereby they are projected as a beam along a variable path through said tank substantially transversely of said given axis, the cross section of said beam taken substantially 180 degrees from said source having a region of irregularity therein caused by concentration of ions of said isotope, an electrode arranged in said tank in intercepting relation with respect to ions of said isotope substantially 180 degrees from said source, and means responsive to the current to said electrode for varying the energy imparted to said ions in order to maintain said intercepting relationship.

7. Apparatus for isotopically enriching an element having at least one isotope occurring in relatively small quantity with respect to the remainder of said element comprising a substantially fluid-tight tank, means for establishing a magnetic field along a given axis through said tank, a source of ions of said element, means for imparting energy to said ions, whereby they are projected as a beam along a variable path through said tank substantially transversely of said given axis, said ions traversing paths in accordance with their respective mass-to-charge ratios forming an ion density distribution having a region of irregularity caused by concentration of ions of said isotope substantially 180 degrees from said source, and ion receiver arranged in said tank in intercepting relation with respect to ions of said isotope substantially 180 degrees from said source, and means responsive to the current to said ion receiver for varying the energy imparted to said ions in order to maintain said intercepting relationship.

8. Apparatus for isotopically enriching an element having at least one isotope occurring in relatively small quantity with respect to the remainder of said element comprising a substantially fluid-tight tank, means for establishing a magnetic field along a given axis through said tank, a source of ions of said element, an ion accelerating electrode, means for applying a potential to said ion accelerating electrode with respect to said source of ions, whereby a beam of said ions is projected along a variable path through said tank substantially transversely of said given axis, the cross section of said beam taken substantially 180 degrees from said source having a region of irregularity therein caused by concentration of ions of said isotope an electrode arranged in said tank in intercepting relation with respect to ions of said isotope substantially 180 degrees from said source, and means responsive to the current to said electrode for varying said potential in order to maintain said intercepting relationship.

9. The combination comprising a calutron for isotopically enriching an element having at least one isotope occurring in relatively small quantity with respect to the remainder of said element including means for establishing a magnetic field along a given axis through said calutron, an ion source unit and an ion accelerating electrode and an ion current collecting electrode, said collecting electrode disposed substantially 180 degrees from said source unit in the region that accelerated ions of said element form an ion density distribution having a region of irregularity caused by concentration of ions of said isotope to intercept ions of said isotope, a resistance network connected between said ion source unit and said ion accelerating electrode, means for applying predetermined constant current through said resistance network, and means responsive to the current to said ion current collecting electrode for varying the resistance of said resistance network to maintain the current to said ion current collecting electrode substantially constant.

10. The combination comprising a calutron including means for establishing a magnetic field along a given axis through said calutron, an ion source unit, an ion accelerating electrode, an ion current collecting electrode, a resistor connected between said ion source unit and said ion accelerating electrode, means for applying a substantially constant current through said resistor, an electron tube having its output connected across a section of said resistor, said electron tube including a control grid responsive to a voltage derived from the current to said ion current collecting electrode for controlling the voltage drop across said resistor.

11. The combination comprising a calutron for isotopically enriching an element having at least one isotope occurring in relatively small quantity with respect to the remainder of said element including means for establishing a magnetic field along a given axis through said calutron, an ion source unit, an ion accelerating electrode and an ion current collecting electrode, said collecting electrode disposed substantially 180 degrees from said source unit in the region that accelerated ions of said element form an ion density distribution having a region of irregularity caused by concentration of ions of said isotope to intercept ions of said isotope, a resistance network connected between said ion source unit and said ion accelerating electrode, means for supplying a substantially constant current through said resistance network to provide an ion accelerating voltage, and means for varying resistance of said network as a direct function of the value of the current to said ion current collecting electrode to vary the ion accelerating voltage and maintain a substantially constant current to said ion current collecting electrode.

12. The combination comprising a calutron including means for establishing a magnetic field along a given axis through said calutron, an ion source unit, an ion accelerating electrode and an ion current collecting electrode, a resistance network connected between said ion source unit and ion accelerating electrode, an electron tube, a source of high voltage, said electron tube and said resistance network being series connected across said high voltage source, means for varying the impedance of said electron tube in response to the current through said resistance network and means responsive to the current to said ion current collecting electrode for varying the resistance of said resistance network.

13. The combination comprising a calutron for isotopically enriching an element having at least one isotope occurring in relatively small quantity with respect to the remainder of said element including means for establishing a magnetic field along a given axis through said calutron, an ion source unit, an ion accelerating electrode and an ion current collecting electrode, said collecting electrode disposed substantially 180 degrees from said source unit in the region that accelerated ions of said element form an ion density distribution having a region of irregularity caused by concentration of ions of said isotope to intercept ions of said isotope, a variable resistor connected between said ion current collecting electrode and ground, a resistance network connected between said ion source unit and said ion accelerating electrode, means for applying predetermined constant current through said resistance network to provide an ion accelerating voltage, and means responsive to the voltage across said variable resistor for varying the resistance of said resistance network for controlling said ion accelerating voltage in order to maintain a substantially constant current to said ion current collecting electrode.

14. The combination comprising a calutron for isotopically enriching an element having at least one isotope occurring in relatively small quantity with respect to the remainder of said element including means for establishing a magnetic field along a given axis through said calutron, a source of ions, an ion accelerating electrode and an ion current collecting electrode, means for applying a high potential to said ion accelerating electrode with respect to said source of ions, thereby projecting a beam of ions through said magnetic field substantially transversely of said given axis toward said ion current collecting electrode, said collecting electrode disposed substantially 180 degrees from said source of ions in the region that said beam of ions forms an ion density distribution having a region of irregularity caused by concentration of ions of said isotope to intercept ions of said isotope, an amplifier for amplifying a voltage derived from the current to said ion current collecting electrode, and means responsive to said amplified voltage for varying said ion accelerating electrode potential to maintain a predetermined intercepting relationship between at least a part of said beam and said collecting electrode.

15. An electrical network comprising a calutron for isotopically enriching an element having at least one isotope occurring in relatively small quantity with respect to the remainder of said element including means for establishing a magnetic field along a given axis through said calutron, a source of ions, an ion accelerating electrode and an ion current collecting electrode, means for applying a potential to said ion accelerating electrode with respect to said source of ions, thereby projecting a beam of ions through said magnetic field substantially transversely of said given axis toward said ion current collecting electrode, said collecting electrode disposed substantially 180 degrees from said source in the region that accelerated ions of said element form an ion density distribution having a region of irregularity caused by concentration of ions of said isotope to intercept ions of said isotope, and means for controlling said potential in accordance with the current to said ion current collecting electrode in order to maintain said current substantially constant.

16. Apparatus for controlling the position of an ion beam in a calutron including an ion source unit, an ion accelerating electrode, ion current collecting means and a magnetic field, amplifier means with the input thereof connected to said ion current collecting means, a high voltage current supply source, resistance means connected across said high voltage source for applying at least a portion of said high voltage between said ion source unit and said ion accelerating electrode, and switch means for disabling a portion of said resistance means during manual control of the calutron and for rendering effective said disabled portion and connecting the output of said amplifier means to control said resistance means in response to current to said ion current collecting means during automatic operation.

17. Apparatus for controlling the position of an ion beam in a calutron including an ion source unit, an ion accelerating electrode, ion current collecting means and a magnetic field, amplifier means with the input thereof connected to said ion current collecting means, a high voltage current supply source, voltage control means including a resistor and a plurality of grid controlled electric discharge devices connected in cascade, the last of said cascade of electric discharge devices having the anode-cathode circuit thereof connected in series with said resistor across said high voltage current supply source for applying at least a portion of said high voltage between said ion source unit and said ion accelerating electrode, means for manually adjusting the grid voltage of the first of said cascade of electric discharge devices to adjust the current through said resistor, and switch means adapted to be connected across a portion of said resistor during manual control of the calutron and for rendering effective said shunted portion of said resistor and connecting the output of said amplifier means to control said voltage control means in response to current to said ion current collecting means during automatic operation.

18. Apparatus for controlling the position of an ion beam in a calutron including an ion source unit, an ion accelerating electrode, ion current collecting means and means for setting up a magentic field for controlling the trajectory of the said ion beam, amplifier means with the input thereof connected to said ion current collecting means, a high voltage current supply source connected to said ion accelerating electrode and said ion source unit also to control the trajectory of the aforesaid ion beam, manually operable means for initially adjusting the position of said ion beam with respect to said ion current collecting means, and means for connecting the output of said amplifier to control the trajectory of said ion beam automatically in response to current to said ion current collecting means after the initial adjustment thereof by said manually operable means.

19. Apparatus for controlling the position of an ion beam in a calutron including an ion source unit, an ion accelerating electrode, ion current collecting means and means for setting up a magnetic field for controlling the trajectory of the said ion beam, amplifier means with the input thereof connected to said ion current collecting means, a high voltage current supply source connected to said ion accelerating electrode and said ion source unit also to control the trajectory of the aforesaid ion beam, means for initially adjusting the position of said ion beam with respect to said ion current collecting means, and means for connecting the output of said amplifier to control the trajectory of said ion beam automatically in response to current to said ion current collecting means after the initial adjustment thereof by said last mentioned means.

20. Apparatus for controlling the position of an ion beam in a calutron including an ion source unit, an ion accelerating electrode, ion current collecting means and means for setting up a magnetic field for controlling the trajectory of the said ion beam, amplifier means with the input thereof connected to said ion current collecting means, a high voltage current supply source connected to said ion accelerating electrode and said ion source unit also to control the trajectory of the aforesaid ion beam, manually operable means for adjusting the voltage between said ion accelerating electrode and said ion source unit to initially adjust the position of said ion beam with respect to said ion current collecting means, and means for connecting the output of said amplifier to control the trajectory of said ion beam automatically in response to current to said ion current collecting means after the initial adjustment thereof by said manually operable means.

21. Apparatus for controlling the position of an ion beam in a calutron including an ion source unit, an ion accelerating electrode, ion current collecting means and a magnetic field, amplifier means with the input thereof connected to said ion current collecting means, a high voltage current supply source, voltage control means including a tapped resistor, a standard voltage source, a potentiometer having the resistor thereof connected across said standard voltage source and the contactor thereof and a variable portion of the potentiometer resistor connected in series with said tapped resistor, and a plurality of grid controlled electric discharge devices connected in cascade, the cathodes of said electric discharge devices being connected to said potentiometer and to said ion source unit of said calutron, the last of said cascade of electric discharge devices having the anode-cathode circuit thereof connected in series with said tapped resistor across said high voltage current supply source for applying at least a portion of said high voltage between said ion source unit and said ion accelerating electrode, the grid of the first of said electric discharge devices being connected to a tap on said tapped resistor whereby the current through said tapped resistor may be varied by varying the contactor of said potentiometer, and switch means adapted to be connected across a portion of said tapped resistor during manual control of the calutron and for rendering effective said shunted portion of said resistor and connecting the output of said amplifier means to control said voltage control means in response to current to said ion current collecting means during automatic operation.

References Cited in the file of this patent

UNITED STATES PATENTS

| | | |
|---|---|---|
| 2,331,189 | Hipple | Oct. 5, 1943 |
| 2,370,673 | Langmuir | Mar. 6, 1945 |
| 2,374,205 | Hoskins | Apr. 24, 1945 |